| United States Patent [19] | | [11] | 4,126,736 |
|---|---|---|---|
| Gisser et al. | | [45] | Nov. 21, 1978 |

[54] ANIONICALLY POLYMERIZED COPOLYMERS OF METHYL α-N-ALKYLACRYLATE AND METHYL METHACRYLATE AND METHOD OF MAKING SAME

[75] Inventors: Henry Gisser, Philadelphia; Helen Mertwoy, Dresher, both of Pa.

[73] Assignee: The United States of America as represented by the Secretary of the Army, Washington, D.C.

[21] Appl. No.: 892,600

[22] Filed: Apr. 3, 1978

Related U.S. Application Data

[62] Division of Ser. No. 761,141, Jan. 19, 1977, Pat. No. 4,098,988.

[51] Int. Cl.$^2$ ................................................ C08F 4/46

[52] U.S. Cl. .................................... 526/173; 526/328
[58] Field of Search ................................. 526/173, 328

[56] References Cited

U.S. PATENT DOCUMENTS

| 3,687,922 | 8/1972 | Gisser et al. | ............................ 526/181 |
| 3,972,864 | 8/1976 | Gisser et al. | ............................ 526/232.1 |

*Primary Examiner*—William F. Hamrock
*Attorney, Agent, or Firm*—Nathan Edelberg; Harold H. Card, Jr.; A. Victor Erkkila

[57] ABSTRACT

Copolymers are formed by reacting methyl methacrylate and methyl α-n-alkylacrylate between 20°–30° C in presence of catalytic amounts of sodium, the alkyl group in the methyl α-n-alkylacrylate having from 10 to 22 carbon atoms.

5 Claims, No Drawings

ANIONICALLY POLYMERIZED COPOLYMERS OF METHYL α-N-ALKYLACRYLATE AND METHYL METHACRYLATE AND METHOD OF MAKING SAME

This invention described herein may be manufactured, used and licensed by or for the Government for governmental purposes without the payment to us of any royalty thereon.

This is a divison of application Ser. No. 761,141, filed Jan. 19, 1977, now U.S. Pat. No. 4,098,988.

This invention relates generally to the copolymers of methyl methacrylate and methyl α-n-alkylacrylate, and to methods of making same. The novel methods are particularly useful in making copolymers which are useful as additives in lubricating fluids; and a solid plastic members, such as gears, bearings, and the like.

U.S. Pat. No. 3,972,864, H. Gisser and H. Nertwoy, describes a free radial copolymerization of methyl methacrylate and methyl α-n-alkylacrylate which forms a clear polymers having better friction properties, better wear resistance, and lower density than polymethyl methacrylate. Now, by the anionic copolymerization of methyl methacrylate and methyl α-n-alkylacrylate, clear copolymers are formed which, at most mole percentages of the monoker units in the copolymer originating from methyl methacrylate, exhibit superior wear properties to those polymers disclosed in the aforementioned patent. It is believed that these superior wear properties are attributable to the fact that anionic polymerizations will provide some degree of stereoregularity.

It is thus an object of the present invention to provide copolymers useful as solid members such as gears, and bearings, where wear resistance is required.

It is a further object to provide low friction and wear compositions useful as additives in lubricating fluids.

These and other objects will be more readily apparent from the following description.

In accordance with the present invention, methyl methacrylate and methyl α-n-alkylacrylate, wherein the alkyl in the latter compound contains 10 to 22 carbon atoms, are reacted in the presence of catalytic amounts of sodium. To provide satisfactorily high molecular weight products and yields, the reaction should be run at least four days, whereupon it may, if desired, be terminated by the addition of a proton donor such as methyl alcohol to the reaction mixture. If particularly high molecular weights are desired, the reaction may be run for longer periods. For good friction and wear properties, the copolymers should have a minimum molecular weight of about 5,000. Theoretically, as long as there is available monomer, anionic polymerizations such as the present will continue in an unreactive solvent free of impurities. High molecular weight copolymers, as produced by longer reaction times than four days, in general, are harder than lower molecular weight copolymers. The reaction should be run at temperatures ranging between 20° C. and 30° C., preferably at 25° C.

The mole percentage of the monomer units in the copolymer originating from methyl α-n-alkylacrylate group ranges from about 10–50%. The mole percentage of the monomer units in the copolymer originating from the methyl methacrylate group ranges from about 90–50%. Below about 10 mole percent of monomer in the copolymer originating from methyl α-n-alkylacrylate, durability suffers; whereas above about 50 mole percent, the reactions proceeds undesirably slowly. Very excellent durability properties obtain in the resultant copolymers when the mole percent of the monomer units in the copolymer originating from methyl α-n-alkylacrylate is about 21%. Particularly good friction properties result in the copolymer at mole percentages of monomer units originating from methyl α-n-alkylacrylate of about 40%. At molecular weights of the copolymers ranging from about 7,000 to 20,000, when the mole percentage of the monomer units originating from methyl methacrylate is about 60%, the copolymer will form as a clear rubbery composition; whereas, at mole percentages of about 79%, the copolymers will form as a hard solid. The mole percentage of the reactants will range from approximately 16–80% methyl α-n-alkylacrylate, and from about 84–20% methyl methacrylate.

In the practice of this invention, our copolymers may be formed into gears, or bearings, by appropriate molding or forming processes. Or the copolymers may be clad over a solid member such as a gear or bearing of polyhexamethylene adipamide (or other solid) by painting or dipping the solid member into a solution of our copolymer of which the solvent may be xylene followed by evaporation of the solvent. Alternatively, these copolymers may be used as lubricating fluid additives.

Friction measurements were conducted by the usual technique in which a ball slides over a flat surface. Wear or durability measurements were conducted by repeated sliding of a ball rider over a single track on a thin film of the material being tested and determining the number of passes required to wear the film away.

The invention will be better understood by reference to the following example:

EXAMPLE

The methyl α-n-alkylacrylates were prepared by the method described in U.S. Pat. No. 3,687,922, H. Gisser and H. E. Mertwoy, which patent is hereby incorporated by reference. That method produces a pure, isomer free, methyl α-n-alkylacrylate. In this example, methyl α-n-hexadecylacrylate was used. Before use, methyl α-n-hexadecylacrylate was recrystallized from methanol and dried to constant weight in a vacuum oven at 40° C. and 1mm Hg. Commercially prepared methyl methacrylate was purified by shaking the methyl methacrylate with 10% NaOH to remove inhibitors, drying the resulting methyl methacrylate over anhydrous $Na_2SO_4$ followed by distilling under nitrogen immediately before use.

A mixture of 2.25 mMol of methyl α-n-hexadecylacrylate and 2.25 mMol methyl methacrylate was placed in a polymerization tube which had been flushed with dry nitrogen. The solvent, 0.7 ml toluene, dried by distilling over sodium under nitrogen, was added to the tube followed by the further addition of 0.2–0.3 mMols sodium. After being alternately evacuated by a vacuum pump and then filled with nitrogen several times to purge the tube of air and moisture, it was sealed and shaken at room temperature (25° C.) for seven days. The tube was then opened, and 1 ml methanol was added to terminate the reaction. The disappearance of the orange-red color of the reaction mixture indicated the reaction had terminated. Next, about 15 ml chloroform was added to the tube until its viscous contents dissolved and the resulting solution was filtered to remove any fragments of glass which were formed when the tube was opened. The solution was then concentrated by allowing the chloroform to substantially evaporate at room temperature, and methanol was added until complete precipitation of the polymer occurred. The supernatant liquid was decanted, the remaining polymer washed several times with methanol and then dried in a vacuum oven at 45°–50° C. under 1 mm Hg. The polymer was purified by repeated precipitation using a chloroform-methanol system of 10 ml chloforom and 30 ml methanol. After each precipitation, the polymer was dried at 40° C. (1 mm Hg) in a vacuum oven. Any unreacted methyl methacrylate would be removed in the drying process because of the high volatility of methyl methacrylate. The copolymer was considered pure when its infrared spectrum showed the disappearance of absorbtion bonds for olefinic linkages found in methyl α-n-hexadecylacrylate.

Details of anionic polymerizations are given in Table I. The homopolymerization of methyl α-n-hexadecylacrylate and methyl methacrylate are also shown for comparative purposes.

TABLE I

| | | | | | | | | | | |
|---|---|---|---|---|---|---|---|---|---|---|
| Anionic Copolymerization of Methyl α-n-alkylacrylates, $CH_2=C(R)CO_2CH_3(M_1)$ With Methyl Methacrylate $(M_2)$ | | | | | | | | | | |
| α-R-Group In $M_1$ | $M_1^a$ Mol % | $M_2^b$ Mol % | Polymerization Time Hours | Yield Mol % | $M_1^c$ Mol % | $xn^d$ | Analysis C(%) | H(%) | O(%) | Mol. Wt.$^e$ |
| Copolymers | | | | | | | | | | |
| $C_{16}H_{33}$ | 33.3 | 67.3 | 168 | 43.2 | 20.7 | 70 | 67.80 | 9.92 | 22.30 | 9,994 |
| $C_{16}H_{33}$ | 50.0 | 50.0 | 168 | 31.8 | 33.8 | 117 | 70.59 | 10.66 | 18.67 | 20,000 |
| $C_{16}H_{33}$ | 66.7 | 33.3 | 168 | 16.7 | 40.2 | 36 | 71.63 | 10.92 | 17.43 | 6,708 |
| $C_{16}H_{33}$ | 75.0 | 25.0 | 168 | 0.34$^f$ | $h$ | $h$ | $h$ | $h$ | $h$ | $h$ |
| Homopolymers | | | | | | | | | | |
| $C_{16}H_{33}$ | 100.00 | 0 | 336 | 42.5 | 100.00 | 6 | 77.53 | 12.32 | 10.17 | 1,940 |
| $CH_3$ | 00.00 | 100.00 | 24 | 91.7 | — | >300 | 60.32 | 31.35 | 8.54 | >30,000$^g$ |

$^a$ Mole % of $M_1$ in initial monomer mixture.
$^b$ Mole % of $M_2$ in initial monomer mixture.
$^c$ Mole % of $M_1$ in copolymer.
$^d$ Number-average degree of polymerization.
$^e$ Number Average Molecular Weight determined by vapor pressure osmometry; where Mol. Wt. is 20,000, error±10%.
$^f$ Weight percent.
$^g$ Mol. Wt. well above the limit for the vapor pressure osmometer.
$^h$ Value not determined.

We claim:

1. A method for the anionic copolymerization of methyl methacrylate and methyl α-n-alkylacrylate having the formula

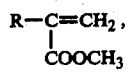

where R is an alkyl having the formula $C_nH_{2n+1}$ where $n$ is at least 10 and not greater than 22, comprising:
   preparing a pure isomer free, methyl α-n-alkylacrylate;
   adding said pure methyl α-n-alkylacrylate to methyl methacrylate and a catalyst consisting of sodium to form a mixture;
   allowing said mixture to react for at least four days in a moisture free and oxygen free atmosphere.

2. A method according to claim 1, wherein the mole percentage of the reactants range from approximately 16–80% methyl α-n-alkylacrylate and from 84–20% methyl methacrylate, and further characterized by the step of running the reaction of about 20°–30° C.

3. A method according to claim 1, further characterized by the step of running the reaction at about 25° C.

4. A method according to claim 1, further enhanced by the step of terminating the reaction by the addition of said mixture of methyl alcohol.

5. A method according to claim 1, wherein said methyl α-n-alkylacrylate is methyl α-n-hexadecylacrylate.

* * * * *